April 10, 1956 E. S. BARTLETT 2,741,136
PORTABLE SHEARING MACHINE
Filed Dec. 11, 1950 4 Sheets-Sheet 1

INVENTOR.
Edwin S. Bartlett
BY
McKenna & Morsbach
ATT'YS.

April 10, 1956     E. S. BARTLETT     2,741,136
PORTABLE SHEARING MACHINE
Filed Dec. 11, 1950     4 Sheets-Sheet 2
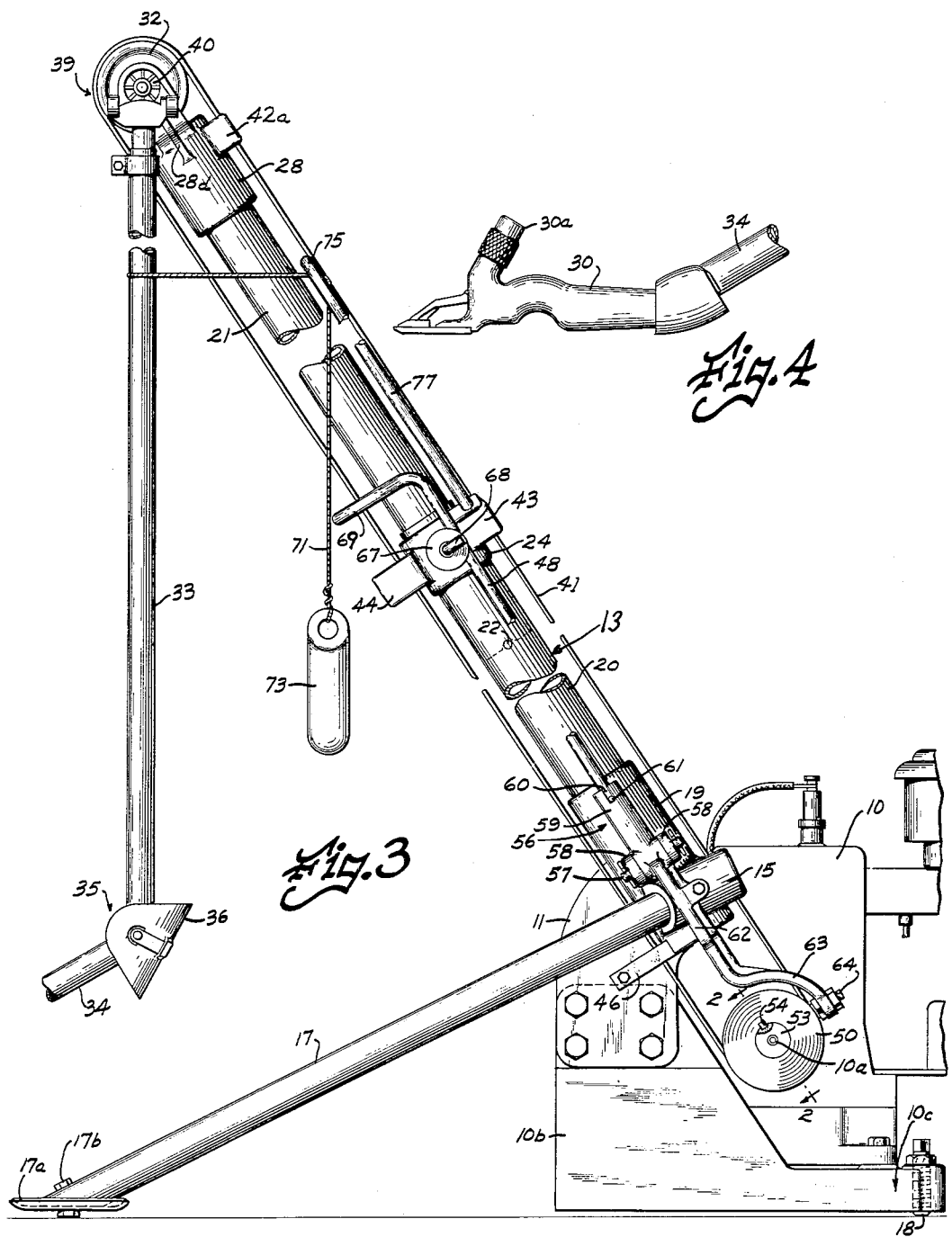
INVENTOR.
Edwin S. Bartlett
BY
McKenna & Morsbach
ATT'YS.

April 10, 1956 E. S. BARTLETT 2,741,136
PORTABLE SHEARING MACHINE
Filed Dec. 11, 1950 4 Sheets-Sheet 3
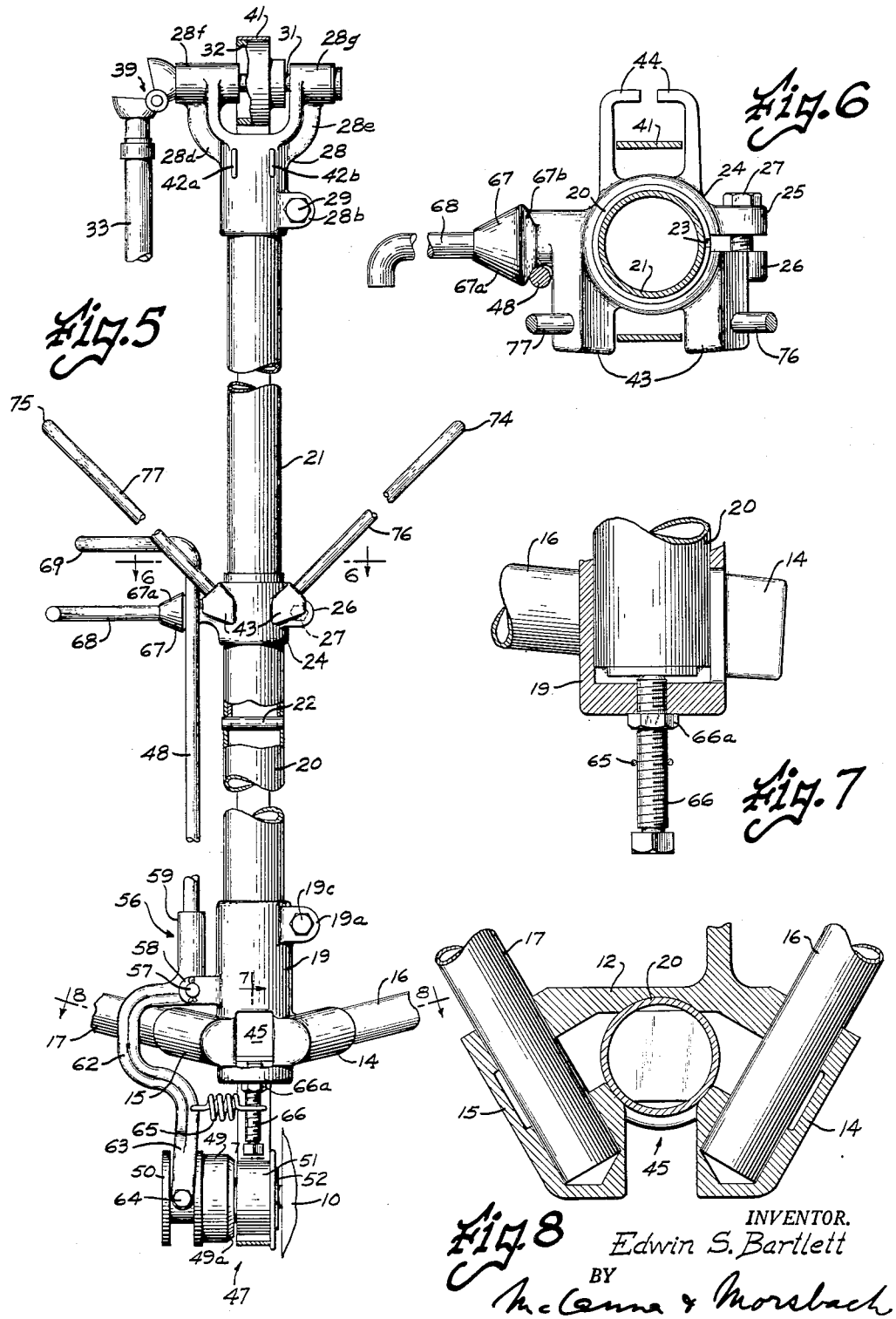
INVENTOR.
Edwin S. Bartlett
BY
McKenna & Morsbach
ATT'YS.

April 10, 1956  E. S. BARTLETT  2,741,136
PORTABLE SHEARING MACHINE
Filed Dec. 11, 1950  4 Sheets-Sheet 4
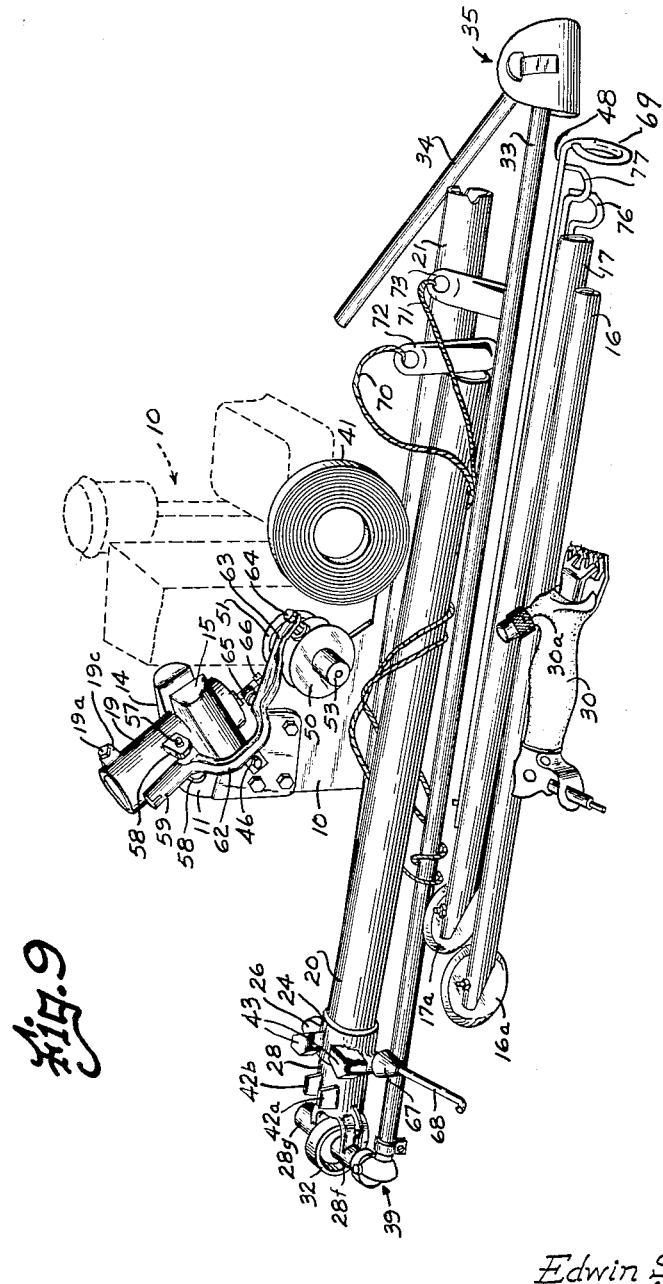
INVENTOR.
Edwin S. Bartlett
BY
McKenna & Morsbach
ATT'YS.

United States Patent Office 2,741,136
Patented Apr. 10, 1956

2,741,136

PORTABLE SHEARING MACHINE

Edwin S. Bartlett, Ludington, Mich., assignor to Sunbeam Corporation, Chicago, Ill., a corporation of Illinois Application December 11, 1950, Serial No. 200,275

9 Claims. (Cl. 74—228)

The present invention relates to machines for shearing animals, and has for one of its objects the provision of an improved animal shearing machine of the self-powered type.

To provide for maximum flexibility of use, an animal shearing machine should have its own source of power and should be light in weight and easy to assemble and disassemble into relatively small components. If these requirements are met, the machine may be easily transported from place to place and may be quickly set up for use in any desired location. Such a machine should also be so constructed that when set up, a sturdy non-movable support is provided for the moving parts thereof, and should be so arranged that the shearing head may be easily manipulated with one hand and may be started and stopped with the same hand.

Accordingly, it is another object of the present invention to provide an improved shearing machine meeting all of the above requirements.

It is a further object of the invention to provide a shearing machine of the character described embodying a supporting structure of light weight which provides rigid support for the moving parts of the machine and yet may be quickly and easily assembled and disassembled.

It is still another object of the invention to provide improved and exceedingly simple facilities for driving the shearing head from the driving motor of the machine, which facilities are so arranged as to permit the machine to be easily and quickly assembled and disassembled.

According to a further object of the invention, an improved easily operated clutch and clutch actuating mechanism is embodied in the machine for selectively breaking and reestablishing the driving connection between the shearing head and the driving motor of the machine.

It is a still further object of the invention to provide an improved and simple arrangement for hobbling the shearing head supporting and driving linkage against undesired oscillatory swinging movement when the machine is in use.

The invention, both as to its organization and method of operation, together with further objects and advantages thereof, will best be understood by reference to the following specification taken in connection with the accompanying drawings in which:

Fig. 3 is a side elevation view of the machine shown in Fig. 1 with certain components broken away and shortened to facilitate illustration thereof;

Fig. 4 is a side perspective view of the shearing head forming a part of the machine;

Fig. 5 is a fragmentary partially sectionalized top elevational view illustrating certain components of the machine;

Fig. 6 is a sectional view taken along the lines 6—6 in Fig. 5;

Fig. 7 is a fragmentary sectional view taken along the lines 7—7 in Fig. 5;

Fig. 8 is a fragmentary sectional view taken along the lines 8—8 in Fig. 5; and

Fig. 9 is a perspective view illustrating the components of the machine when disassembled.

Figures 1, 2:
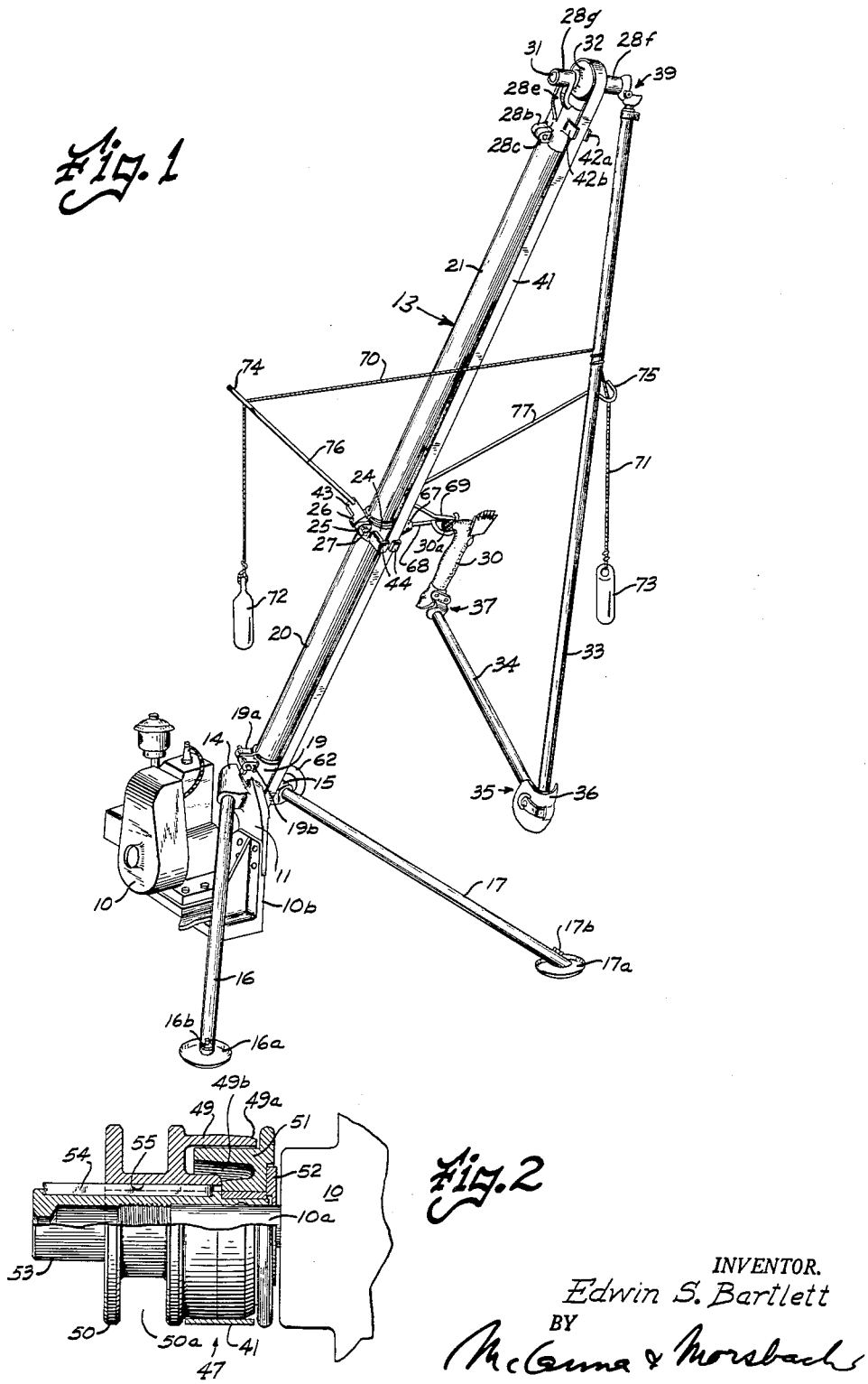
Fig. 1 is a perspective view of the present improved shearing machine.
Fig. 2 is a side view, partially in section, illustrating the details of the clutch mechanism of the machine shown in Fig. 1.

Referring now to the drawings and more particularly to Figs. 1, 3 and 5 thereof, the present improved shearing machine is there illustrated as comprising a driving motor 10, preferably in the form of a four-cycle gasoline engine, supported upon a motor base 10b which also acts partially to support the other components of the machine. Specifically, the motor base 10b rigidly mounts a boom support generally indicated at 11 which in turn rigidly but detachably supports an elongated tubular boom 13 in an inclined position. As best shown in Figs. 1, 3, 5 and 7, the boom support 11 includes a boom supporting bracket 12 which is provided with leg receiving sockets 14 and 15 which are adapted slidably to receive two tubular legs 16 and 17. These legs extend divergingly outward from the motor base 10b on either side of the boom 13 and in cooperation with the motor base form a three-point tripod support for the boom. At their outer ends, the legs 16 and 17 are respectively provided with upwardly dished plates 16a and 17a which serve to supply the necessary supporting surface when the machine is set up for use on loose soil. These plates are preferably secured to the outer ends of the legs 16 and 17 by means of bent bolts 16b and 17b which extend transversely through the leg ends. As best shown in Fig. 3 of the drawings, the motor base 10b is provided along its rear edge 10c with a supporting screw 18 which is threaded through the base 10b and has a pointed lower end for gouging into a wood or concrete floor upon which the machine may be supported to prevent the machine from "walking" when the motor 10 is in operation. With this arrangement, the weight of the motor 10 and base 10b serves to counter-balance the weight of that portion of the boom 13 which extends outwardly beyond the outer supporting ends of the legs 16 and 17 as well as the weight of the shearing mechanism, described below, which is swingingly supported at the elevated upper end of the boom. The described three-point support for the boom 13 has the advantage that the engine itself is used as the counterbalancing weight. This permits the motor base included in the support 11 to be made of a light weight material, such as aluminum, thereby decreasing the overall weight of the machine and rendering the same more easily portable. Moreover, the described tripod mounting arrangement for the boom 13 is such that the thrust forces produced upon the two leg sockets 14 and 15 of the boom support 11 as a result of the weight of the boom 13 and the machine components supported thereby, tend to urge these sockets downwardly against the ends of the legs 16 and 17, respectively, thus eliminating the necessity for set screw connections between the socket parts 14 and 15 and the telescopically received upper ends of the legs 16 and 17.

As best shown in Fig. 5 of the drawings, the lower end of the boom 13 is telescopically received within a split socket 19 forming a part of the boom supporting bracket 12. This socket is provided with clamping lugs 19a and 19b which are adapted to be drawn together by means of a clamping screw 19c to clamp the lower end of the boom 13 in a set position within the socket 19. The boom 13 is comprised of two tubular sections 20 and 21, the lower section 20 of which has an internal diameter equalling the external diameter of the upper section 21 so that the lower end of the latter section may be telescoped into the upper end of the lower section 20. A stop pin 22 peened over at its ends and extending through aligned openings in the upper end of the lower boom section 20 is provided to limit the inward telescopic movement of the upper boom section 21. In order to clamp the upper boom section 21 in a fixed position, the upper end of the lower boom section 20 is slotted longitudinally as indicated at 23 in Fig. 6 and a split clamping element 24 is provided clampingly to embrace this slotted portion of the boom section 20. The clamping element 24 is in the form of a semi-resilient casting and serves several additional functions which are fully described below. As shown in Fig. 6, the element 24 is provided with laterally extending clamping lugs 25 and 26, the first of which is drilled to receive a clamping screw 27 and the last of which is drilled and tapped to receive the threaded end of the screw 27 so that the ring portion of the element 24 may be drawn taut about the slotted upper end of the boom section 20 to clamp the inner surface of this portion of the boom section 20 against the outer surface of the lower end portion of the upper boom section 21.

At its upper end, the upper boom section 21 carries a supporting bracket 28 having a bifurcated upper end and provided with a split sleeve portion which clampingly embraces the upper end of the upper boom section 21. Thus, and as best shown in Figs. 1 and 5, the sleeve of the supporting bracket 28 is longitudinally slotted between two laterally projecting clamping lugs 28b and 28C which may be drawn together to clamp the sleeve against the upper end of the boom section 21 by means of a clamping screw 29. With the described arrangement, all parts of the boom 13 are positively prevented from rotating relative to each other or relative to the boom support 11 or the motor base 10b.

At its elevated upper end, the boom 13 swingingly supports shearing means including a shearing hand piece or head 30 which may be of any conventional oscillatory type capable of being driven by a rotatable element, but preferably is of the improved form disclosed and claimed in applicant's copending application Serial No. 168,127, filed June 14, 1950, now Patent No. 2,651,107. More specifically, the spaced bifurcations 28d and 28e of the upper end fixture 28 terminate in bearing supports 28f and 28g, respectively, which are utilized to support bearings in which is journaled a rotatable shaft 31 having fixedly mounted thereon a flat faced driven pulley 32. The left end of the shaft 31 as viewed in Fig. 5 is utilized as the support for the linkage mechanism included in the shearing means which detachably supports the shearing hand piece 30 at the extremity thereof. This linkage mechanism is arranged to provide for universal swinging movement of the shearing hand piece 30 and is comprised of two tubular sections 33 and 34 which are joined together by a universal joint, not shown, but indicated generally at 35 in Figs. 1 and 3 of the drawings. The components of this universal connection are covered by a guard 36 which is pivotally supported by one of the pivot pins of the universal connection in such manner as not to interfere with universal movement between the two tubular linkage sections 33 and 34. The shearing hand piece 30 is detachably connected to the outer extremity of the tubular linkage section 34 by means of a second universal connection indicated generally at 37, and the upper end of the second linkage section 33 is connected to the shaft 31 by means of a third universal connection indicated generally at 39. The tubular linkage sections 33 and 34 serve as housings and bearing supports for drive shaft sections through which the rotary motion of the drive pulley 32 and the shaft 31 are transmitted to the shearing hand piece 30 for conversion into oscillatory motion of the oscillating cutter forming a part of this hand piece. In this connection, it will be understood that the cog wheels or gears, one of which is indicated at 40 in Fig. 3 and forms a part of the universal connection 39, which are provided as components of the universal collections 35, 37 and 39 and through which rotary motion is transmitted first from the shaft 31 to the shaft section in the linkage section 33, then to the shaft section in the linkage section 34, and finally to the driveshaft of the hand piece 30, are so arranged as not to interfere in any way with the desired universal movement at any one of the three universal connections 35, 37 and 39. Since universal connections of the type described and embodying facilities for transmitting rotary motion between two shaft sections of a universal linkage mechanism are well known, a detailed description of the illustrated connections will not be included herein.

For the purpose of driving the driven pulley 32 to transmit rotary motion through the shafting of the described universal movement linkage to the input shaft of the hand piece 30, a flat endless drive belt 41 is provided which encircles the boom 13 from end to end so that opposed sides of the loop formed thereby are disposed on opposite sides of the boom. In order to confine the travel of this belt in the desired path so that it will not slip off of the driven pulley 32, guide means are provided at various points along the path of travel thereof. Specifically, the fixture 28 provided at the upper end of the boom 13 is equipped with a pair of integrally formed guide fingers 42a and 42b which define a channel traversed by the belt 41 and serve to guide the belt onto the pulley 32 at the upper end of the boom. Intermediate the ends of the boom 13, the clamping element 24 is provided with two sets of oppositely directed belt guide projections 43 and 44 which are likewise traversed by the belt 41 during movement of this belt toward and away from the pulley 32, respectively. Adjacent the lower end of the boom 13, the projecting end portions of the leg sockets 14 and 15 define another belt guide channel 45 which is traversed by the belt 41 as it moves toward the driven pulley 32. The belt 41 is additionally guided during its return movement from the pulley 32 by means of a small guide piece 46 which is bolt or screw mounted on the support 11 in the manner best illustrated in Fig. 3 of the drawings.

As will be understood, the belt 41 is adapted to be driven from the power output shaft 10a of the driving motor 10. In accordance with one feature of the present invention, improved facilities are provided for selectively establishing and breaking a driving connection between the motor shaft 10a and the belt 41. These facilities comprise a clutch assembly mounted upon the motor shaft 10a and indicated generally at 47 and a manually operable clutch control element in the form of a rod 48 which extends longitudinally along the boom 13 to a point just beyond the clamping element 24. The details of the clutch assembly are best illustrated in Figs. 2 and 5 of the drawings. As there shown, this assembly comprises a driving pulley 49 formed integrally with a grooved clutch actuator 50, a flanged loose pulley 51 having an external belt facing surface of substantially less diameter than the corresponding surface of the driving pulley 49 and a bearing washer 52 forming an axial bearing surface for the flanged end of the loose pulley 51. The pulleys 49 and 51, together with the clutch actuator part 50 are carried by a sleeve 53 which is pinned or otherwise fixedly mounted upon the motor shaft 10a. This sleeve is slotted to receive a key 54 which extends through a keyway 55 formed in the bore of the pulley 49 and actuator 50, thus providing for axial sliding movement of the components 49 and 50 along the sleeve 53 while rotating these components with the motor shaft 10a. The loose pulley 51 is rotatably mounted on the sleeve 53 so that it is free to float when the driving pulley 49 is disengaged therefrom. In this regard and as best shown in Fig. 2, the driving pulley 49 is hollowed out as clearly indicated to receive the loose pulley 51, so that by sliding the components 49 and 50 along the sleeve 53 toward the motor 10 the pulley 49 covers the belt supporting surface of the loose pulley 51, whereas by sliding the two components 49 and 50 axially along the sleeve 53 away from the motor 10, the belt supporting surface of the loose pulley 51 is exposed.

For the purpose of sliding the clutch assembly components 49 and 50 axially of the sleeve 53 between the two described positions, the clutch control element 48 is detachably connected at its lower end with a lever 56 which is supported by means of a pivot pin 57 upon pivot lugs 58 formed integral with the boom support 11. At its upper end, this lever is provided with a socket 59 for telescopically receiving the lower end of the clutch control rod 48, the wall of this socket being slotted as indicated at 60 to receive a pin 61 extending traversely through the rod 48, thereby to prevent relative rotation between the two parts 48 and 56 while permitting ready detachment of the rod 48 from the lever 56. As shown, the lever 56 is provided with a U-shaped portion 62 which extends around the leg socket 15 of the boom support 11 to prevent this leg socket from interfering with pivotal movement of the lever. At its lower extremity, the lever 56 is provided with an arcuate portion 63, the end of which fixedly supports a pivot pin 64. The inner end of this pin rotatably supports a small roller, not shown, which is disposed in the channel 50a of the clutch actuator 50 and serves to move the actuator 50 and driving pulley back and forth axially of the sleeve 53 in response to pivotal movement of the lever 56.

With the above described arrangement, it will be understood that when the clutch control rod 48 is pivoted away from the boom 13 about the pivot pin 57, the roller carried by the pivot pin 64 at the lower extremity of the lever 56 is moved against the inner flange of the clutch actuator 50 to slide this actuator and the driving pulley 49 to the described position wherein the driving pulley entirely covers the loose pulley 51. In order to bias the parts 48, 56, 50 and 52 to positions wherein the driving pulley 50 normally covers the loose pulley 52, a coil spring 65 is provided which is tensioned between the lower arm of the lever 56 and an adjusting screw 66 threaded into the bottom wall of the boom socket 19. As will also be understood from the above description, when the clutch control rod 48 is pivoted in toward the boom 13 against the bias of the spring 65, the lever 56 is pivoted to move the clutch components 49 and 50 to the left as viewed in Fig. 5, thereby to uncover the loose pulley 51.

In order to provide a support for the upper end of the clutch control rod 48 and additionally to provide a support for the hand piece 30 when running but not in use, the clamping element 24 positioned at the upper end of the lower boom section 20 is equipped with a double cone shaped part 67 having an axial bore therein for receiving an L-shaped supporting arm 68. To facilitate hanging of the hand piece 30 from the arm 68, the hand piece is provided with a hanger projection 30a, best shown in Fig. 4 of the drawings. The double cone shaped part 67 of the clamping element 24 is utilized as an over-center element to assist in restraining the clutch control rod 48 in the two different settings which respectively correspond to the two different positions of the clutch driving pulley 49. Thus, to move the rod 48 to its clutch release setting, the upper end of this rod, which is bent so that it is normally self-biased against the arm 68, is forced up the conical surface 67a of the part 67 and slides down the steeper conical surface 67b until it is disposed in the channel between the surface 67b and the adjacent belt guide projection 43. Preferably, the biasing force exerted upon the lower arm of the lever 56 by spring 65 is sufficient to force the rod 48 up over the conical surface 67b, down the surface 67a and against arm 68 to move the driving pulley 49 of the clutch 47 into its clutching position in the absence of a restraining force tending to hold the rod 48 in the channel between the part 67 and the adjacent belt guide projection 43. If desired, this restraining force may be supplied by the weight of the hand piece 30. To this end, the upper end of the clutch control rod 48 is formed into a supporting loop 69 which is adapted to receive the hanger projection 30a of the hand piece 30. When the hand piece is thus supported from the loop 69, the weight of the hand piece is sufficient in conjunction with the taper of cone face 67b to retain the rod 48 in the channel between the part 67 and adjacent belt guide projection 43 of the clamping ring 24 against the bias exerted upon the lever 56 by the spring 65. It will be understood, however, that when the hand piece 30 is manually lifted to remove the weight thereof from the supporting loop 69, the spring 65 automatically snaps the rod 48 up cone face 67b and over the part 67 and against the arm 68 and thus moves the driving pulley 49 into the belt engaging position, i. e., the position where it is telescoped over the loose pulley 51.

Briefly to consider the manner in which the belt 41 is selectively connected in driven relationship with the motor shaft 10a through operation of the above-described clutch assembly 47, it is first pointed out that the belt guides, and particularly the guide bracket 46 and the guide facilities defining the belt channel 45, serve to position the lower end of the belt so that it encircles the loose pulley 51. Accordingly, when the driving pulley 49 is shifted to the clutching position to cover the loose pulley 51, the tapered right edge 49a of the pulley engages the edge of the belt causing the belt to ride up onto the rotating pulley and thus facilitate movement of the driving pulley entirely between the belt and the loose pulley 51. When the right tapered edge 49a of the driving pulley is brought adjacent the right flange of the loose pulley 51, the belt 41 is riding completely on the belt drive surface of the pulley 49 so that the desired driving connection is established between this pulley and the driven pulley 32. In this connection, it is noted that by loosening the clamping screw or bolt 19c and threading the adjusting screw 66 into or out of the boom socket 19 of the support 11, the boom 13 may be moved lengthwise to vary the belt tension as desired. Once the desired tension is established, the clamping screw 19c and the lock nut 66a may be tightened to hold the boom 13 in the position in which the desired belt tension is obtained. It will be apparent that when the clutch control rod 48 is operated to withdraw the driving pulley 49 to its unclutched setting, the belt guide 46 and the left side of the channel 45 prevent the belt 41 from following the axial movement of the driving pulley. Accordingly, the driving pulley 49 is withdrawn from beneath the belt 41 permitting this belt to go slack around the loose pulley 51, with the result that the driving connection between the motor shaft 10a and the driven pulley 32 is broken.

During operation of the machine when power is delivered through the described power transmission mechanism to the drive shaft of the hand piece 30, rotation of the shafting within the universal movement linkage comprising the link sections 33 and 34 has a tendency, unless restrained, to cause this linkage to oscillate in a somewhat circular path. Such oscillation of the described linkage is objectionable since it makes it difficult for the operator properly to manipulate the hand piece 30. In order to prevent such oscillatory motion of the linkage from occurring, facilities are provided for hobbling the linkage in any desired position to which it may be adjusted by the operator. These facilities comprise a pair of hobble strings or string sections 70 and 71 which are tied at their ends to the linkage section 33 intermediate the ends of the latter component. At their free ends the strings 70 and 71 carry hobble weights 72 and 73 respectively. Intermediate their ends, the strings 70 and 71 are slidably supported in supporting loops 74 and 75 formed at the outer extremities of a pair of rodlike arms 76 and 77 which extend laterally outward from the boom 13 and are detachably supported at their inner ends in sockets formed in the belt guide projections 43 of the clamping element 24. With this arrangement and when weights 72 and 73 of appropriate sizes are used, the pendulumlike swing of the linkage mechanism which develops because of movement of the handpiece 30 to which the linkage mechanisms 33 and 34 are attached is damped. Specifically, the forces exerted upon the linkage section 33 by the weighted flexible hobble strings 70 and 71 serve to prevent oscillatory movement of the linkage mechanism as a result of the forces developed therein through rotation of the shafting extending therethrough.

The mode of operation of the present improved shearing machine will be readily apparent from the foregoing explanation. Briefly summarized, it will be understood that with the motor 10 in operation and the components of the clutch assembly 47 occupying the positions illustrated in Fig. 5 of the drawings, the driving connection between the motor output shaft 10a and the hand piece 30 is broken. However, when the hand piece 30 is lifted from the supporting loop 69 of the clutch control rod 48, the spring 65 snaps the upper end of this rod over the double-cone-shaped part 67 of the clamping element 24, permitting the lever 56 to pivot in a counterclockwise direction as viewed in Fig. 5 and move the driving pulley 49 beneath the belt 41 to establish a driving connection between the pulley 49 and the driven pulley 32, whereby power is transmitted to the power input shaft of the hand piece 30. With the hand piece in operation, it may be supported from the arm 68 without interrupting the operation thereof in order to free both hands of the operator for manipulation of the animal being sheared. On the other hand, if it is desired to stop the machine, the clutch control rod 48 may be forced over the part 67 and the hand piece 30 supported from the supporting loop 69 of this rod, thereby to interrupt the driving connection between the driving pulley 49 and driven pulley 32 in a manner which will be clearly apparent from the above explanation.

As previously indicated, one important feature of the present improved construction is the arrangement whereby the machine may be easily and quickly set up or dismantled. To this end, the hobble strings 70 and 71 with the weights 72 and 73 attached thereto are first untied from the linkage section 33 and removed. Following this operation, the hobble string supporting arms 76 and 77 are withdrawn from their supporting sockets in the belt guide projections 43 of the clamping element 24. The next operation is that of removing the belt 41. In this connection, it will be understood that when the driving pulley 49 of the clutch assembly 47 is withdrawn to its unclutched setting, the belt 41 loosely encircles the two pulleys 32 and 51, with the result that this belt may easily be slipped off of the upper pulley 32 and disengaged from the described belt guide projections along the boom 13. After the belt is thus removed, the clamping screw 27 may be loosened to permit the upper boom section 21 to be withdrawn longitudinally from the upper end of the lower boom section 22. As best shown in Fig. 9 of the drawings, after the boom section 21 is thus detached from the rest of the machine, this section, together with the linkage sections 33 and 34, may be folded so that the overall length of the three pieces is no longer than the length of the linkage section 33 alone. After the described operations are performed, the clutch control rod 48 may be slipped out of its receiving socket in the upper end of the lever 56. The lower boom section 20 may now be removed from its socket 19 in the boom support 11 by loosening the clamping screw 19c. Following this operation, the front edges of the motor 10 and base 10b may be lifted slightly, permitting the supporting legs 16 and 17 to be readily withdrawn from their receiving sockets 14 and 15 in the boom support 11. The various components of the machine may now be assembled or stacked in the manner indicated in Fig. 9 of the drawings and, as will be apparent from an inspection of this figure, the components are of such sizes as to permit the same to be readily carried in the trunk of a passenger vehicle. The mode of assembly of the described components of the machine when it is desired to set up the machine in a given location is the exact reverse of the described mode of disassembling the machine. From this description it will be clearly apparent that the machine may be fully assembled very quickly and without the use of special tools. Moreover, no special supports are required for any of the parts of the machine. In other words, the machine is entirely self-contained.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In a shearing machine, an elongated boom, a driving motor provided with a base, a boom support mounted upon said motor base to support said boom in an inclined position, legs attached to said support to extend laterally outward therefrom and to form with said motor base a tripod support for said boom, the elevated end base of said boom extending outwardly beyond the ends of said legs, means swingingly supported from the elevated end of said boom, the weight of said motor and motor base acting to counter balance the weight of said boom and the means swingingly supported thereby, and means for driving said swingingly supported means from said motor.

2. In a shearing machine, an elongated boom, a driving motor provided with a base, a boom support mounted upon said motor base detachably to support said boom in an inclined position, legs detachably connected to said boom support and extending laterally outward therefrom substantially perpendicularly to said boom to form with said motor base a tripod support for said boom, the elevated end of said boom extending outwardly beyond the ends of said legs, means swingingly supported from the elevated end of said boom, the weight of said motor and motor base acting to counter balance the weight of said boom and the means swingingly supported thereby, and means for driving said swingingly supported means from said motor.

3. In a shearing machine, a driving motor provided with a base, said motor including a power output shaft having a drive pulley mounted thereon, an elongated boom at least partially supported by said motor base and extending outwardly and upwardly therefrom, a pair of legs connected to support said boom by forming with said motor base a tripod support, said boom comprising two sections having telescoped end portions intermediate the ends of said boom, a clamping element clamping the telescoped end portions of said two boom sections together, a driven pulley rotatably mounted at the elevated end of said boom, a belt extending between said pulleys and encircling said boom from end to end to drive said driven pulley from said drive pulley, oppositely directed belt guides projecting outwardly from said clamping element and traversed by said belt, and means swingingly supported from the elevated end of said boom and driven by said driven pulley.

4. In a shearing machine, a driving motor provided with a base, said motor including a power output shaft having a drive pulley mounted thereon, an elongated boom at least partially supported by said motor base and extending outwardly and upwardly therefrom, said boom comprising two sections having telescoped end portions intermediate the ends of said boom, a clamping element clamping the telescoped end portions of said two boom sections together, a driven pulley rotatably mounted at the elevated end of said boom, a belt extending between said pulleys and encircling said boom from end to end to drive said driven pulley from said drive pulley, oppositely directed belt guides projecting outwardly from said clamping element and traversed by said belt, a universal movement linkage supported from the elevated end of said boom, hobble strings connected to said linkage intermediate the ends thereof, hobble weights connected to the free ends of said strings, and arms projecting outwardly from said clamping element slidably to support said hobble weighted strings intermediate their ends at points laterally removed from said boom.

5. In a shearing machine, a driving motor provided with a base, an elongated boom at least partially supported by said motor base and extending outwardly and upwardly therefrom, said motor including a power output shaft having a drive pulley mounted thereon, a driven pulley rotatably mounted at the elevated end of said boom, a belt extending between said pulleys on either side of said boom to drive said driven pulley from said drive pulley, a multi-section universal movement linkage supported from the elevated end of said boom, hobble strings connected to one section of said linkage, hobble weights connected to the free ends of said strings, and arms supported upon and projecting outwardly from said boom intermediate the ends of said boom slidably to support said hobble weighted strings intermediate their ends at points laterally removed from said boom.

6. In a shearing machine, an elongated boom, a driving motor provided with a base, means including said motor base for supporting said boom in an inclined position, said motor including a power output shaft, a clutch mechanism mounted upon said shaft and including a driving pulley and an actuator movable back and forth axially of said shaft between two positions to establish and break a driving connection between said pulley and a belt, a driven pulley rotatably mounted at the elevated end of said boom, a belt extending between said pulleys to drive said driven pulley from said drive pulley, a clutch control element extending longitudinally of said boom and pivotally movable between two settings to move said actuator between said two positions, and means swingingly supported from the elevated end of said boom and driven by said driven pulley, said swingingly supported means including a driven element adapted to be supported by said clutch control element when not in use to aid in restraining said clutch control element in the one of its two settings wherein the driving connection between said belt and said driving pulley is broken.

7. In a shearing machine, an elongated boom, a driving motor provided with a base, means including said motor base for supporting said boom in an inclined position, said motor including a power output shaft, a clutch mechanism mounted upon said shaft and including a loose pulley, a hollow driving pulley of larger external diameter than said loose pulley and movable axially of said shaft to cover said loose pulley and establish a driving connection with a belt encircling said loose pulley and an actuator movable with said driving pulley axially of said shaft between two positions wherein said loose pulley is respectively covered and exposed, a driven pulley rotatably mounted at the elevated end of said boom, a belt extending between said pulleys to drive said driven pulley from said drive pulley, a clutch control element extending longitudinally of said boom and pivotally movable between two settings to move said actuator between said two positions, and means swingingly supported from the elevated end of said boom and driven by said driven pulley, said swingingly supported means including a driven element adapted to be supported by said clutch control element when not in use to aid in restraining said clutch control element in the one of its two settings wherein the driving connection between said belt and said driving pulley is broken.

8. In a shearing machine, an elongated boom, a driving motor provided with a base, means including said motor base for supporting said boom in an inclined position, said motor including a power output shaft, a clutch mechanism mounted upon said shaft and including a driving pulley and an actuator movable back and forth axially of said shaft between two positions to establish and break a driving connection between said pulley and a belt, a driven pulley rotatably mounted at the elevated end of said boom, a belt extending between said pulleys to drive said driven pulley from said drive pulley, a clutch control element extending longitudinally of said boom and pivotally movable between two settings to move said actuator between said two positions, means swingingly supported from the elevated end of said boom and driven by said driven pulley, said swingingly supported means including a driven element adapted to be supported by said clutch control element when not in use to aid in restraining said clutch control element in the one of its two settings wherein the driving connection between said belt and said driving pulley is broken, and means responsive to disengagement of said driven element from said clutch control element for moving said actuator to the position wherein the driving connection between said belt and driving pulley is reestablished.

9. In a shearing machine, an elongated boom, a driving motor provided with a base, means including said motor base for supporting said boom in an inclined position, said motor including a power output shaft, a clutch mechanism mounted upon said shaft and including a loose pulley, a hollow driving pulley of larger external diameter than said loose pulley and movable axially of said shaft to cover said loose pulley and establish a driving connection with a belt encircling said loose pulley and an actuator movable with said driving pulley axially of said shaft between two positions wherein said loose pulley is respectively covered and exposed, a driven pulley rotatably mounted at the elevated end of said boom, a belt extending between said pulleys to drive said driven pulley from said drive pulley, a clutch control element extending longitudinally of said boom and pivotally movable between two settings to move said actuator between said two positions, means swingingly supported from the elevated end of said boom and driven by said driven pulley, said swingingly supported means including a driven element adapted to be supported by said clutch control element when not in use to aid in restraining said clutch control element in the one of its two settings wherein the driving connection between said belt and said driving pulley is broken, and means responsive to disengagement of said driven element from said clutch control element for moving said actuator to the position wherein the driving connection between said belt and driving pulley is reestablished.

References Cited in the file of this patent
UNITED STATES PATENTS

| Number | Name | Date |
|---|---|---|
| 116,885 | Tally et al. | July 11, 1871 |
| 233,294 | Starr | Oct. 12, 1880 |
| 249,426 | Waltner | Nov. 8, 1881 |
| 259,073 | Anderson | June 6, 1882 |
| 336,229 | Grout | Feb. 16, 1886 |
| 420,678 | Eisenhuth | Feb. 4, 1890 |
| 541,288 | Newall | June 18, 1895 |
| 550,593 | Coates | Dec. 3, 1895 |
| 558,640 | Drysdale | Apr. 21, 1896 |
| 604,869 | Stewart | May 31, 1898 |
| 655,796 | Priest | Aug. 14, 1900 |
| 1,219,545 | Gilbertson | Mar. 20, 1917 |
| 1,363,471 | Kocourek | Dec. 28, 1920 |
| 1,641,130 | Elliott | Aug. 30, 1927 |
| 2,567,128 | Shoffner | Sept. 4, 1951 |